Jan. 24, 1950     L. M. KROGMAN     2,495,265
CAMERA AND LIGHTING SUPPORT
Filed Feb. 28, 1947
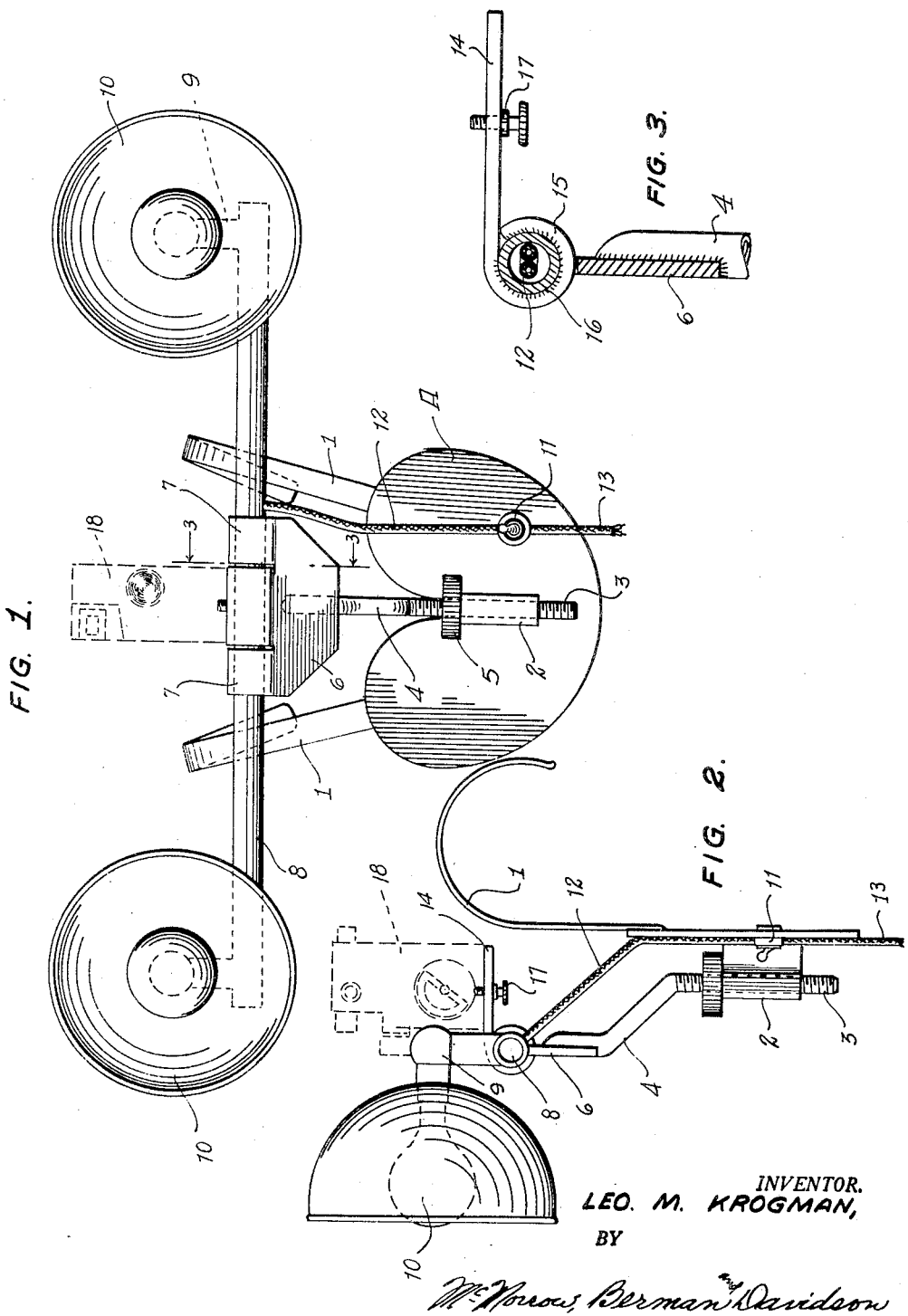
INVENTOR.
LEO. M. KROGMAN,
BY
McMorrow, Berman & Davidson
ATTORNEYS.

Patented Jan. 24, 1950

2,495,265

UNITED STATES PATENT OFFICE 2,495,265

CAMERA AND LIGHTING SUPPORT

Leo M. Krogman, Chicago, Ill.

Application February 28, 1947, Serial No. 731,627

2 Claims. (Cl. 240—2)

This invention relates to new and useful photographic equipment and especially a camera and lighting support of which the following is a specification.

The primary object of this invention resides in the provision of a support construction adapted to be portably supported upon the body of a person and which carries a camera and lighting equipment in such a manner as to position the camera directly before the wearer to make it readily available for use.

Another object of this invention is the provision of a device of the character described in which dual lights are mounted on the support in conjunction with the camera thereon and said lights are adapted, by construction, to operate with the camera to automatically focus the lights upon the object being viewed by the camera.

Another and still further object of this invention is the provision of a device of the character set forth which is provided with adjustable means for the camera to permit its vertical positioning to the pleasure of the wearer and a construction in the mounting of the camera and the lighting equipment therewith making it universally movable so as to allow it to follow the motion of an object or subject facilitating its use with a motion picture camera.

Still a further object of this invention is the provision of a device of the character described which embodies features in the removable mounting of the camera to the construction as well as novel features of construction for the electric wiring to the lighting elements of the invention.

Still further advantages and objects of this invention reside in the provision of photographic equipment of the nature described which is of a compact and simple design, and which is of an extremely simple and inexpensive construction thereby making it readily available to the general public.

Still further improvements and advantages of this invention will readily appear to those skilled in the art when the following description is read in the light of the accompanying drawings in which:

Fig. 1 is a front elevation of the assembled device.

Fig. 2 is a side elevation of the device.

Fig. 3 is a vertical section taken on line 3—3 of Fig. 1.

Referring now to the accompanying drawings which illustrate the preferred embodiment of this invention and in which like numerals indicate similar parts throughout A designates a flat heart-shaped plate of a metallic or plastic nature which is provided with a pair of angularly disposed curved metallic straps 1 extended therefrom in a manner adapting the plate A to be positioned adjacent the chest of a person with the straps 1 disposed over the shoulders of the person to comfortably retain the plate in place.

A vertical tube 2 is secured centrally upon the plate A adapting it to receive the lower vertical threaded end 3 of a circular bar 4 which extends upwardly therefrom and outwardly in an angular extension to terminate at a spaced distance above and in front of the plate A. The threaded end 3 of this circular rod is provided with an internally threaded collar 5 thereon adapted for vertical threaded movement thereabout above the tube 2 and resting upon the top thereof, making said circular rod vertically adjustable relative to said tube and allowing its rotatable motion therein.

The upper outer end of the rod 4 carries a vertical plate 6 secured rotatably thereto, said plate being provided with a pair of spaced horizontally disposed cylindrical ears 7 at the upper end thereof adapted to rotatably receive an elongated circular bar 8 therethrough.

Each outer end of the circular bar 8 is provided with a suitable fitting 9 adapting a pair of photographic flood lights 10 or the like to be secured, one to each end thereof in a forwardly disposed position relative thereto. An electric snap switch 11 is carried on the front of the plate A and an insulated lead 12 runs therefrom upwardly to enter into the hollow center of the circular bar A where it branches to connect each of the lights through said bar to said switch, and an elongated extension wire or insulated lead 13 is tied to said switch and is adapted to be secured to a permanent source of electricity for the energization of the lamps by the operation of the switch 11.

A flat rectangular plate 14 is provided adjacent the circular bar 8 and one end of said plate is formed about the rod as at 15, between the spaced ears 7 of the plate 6, and secured by weld or the like as at 16 to said bar adapting the rotation of said plate 14 with said bar when said bar rotates within the circular ears 7 of the plate 6. A set screw 17 is carried centrally beneath the plate 14 to project upwardly therethrough adapted to threadedly engage a threaded socket within the base of a motion picture camera 18 or the like to secure said camera to said plate.

Thus from the construction illustrated and described it may be readily seen that the plate may be donned by a person by placing the shoulder straps over a person's shoulders and bringing the plate to lie adjacent his chest. When said plate is worn in this position the camera 18 will be disposed directly before the eyes of the wearer and may be vertically adjusted by means of the threaded collar 5 for minute adjustments necessary to bring the viewing lens of the camera directly before his eye and thus allowing the complete freedom of both hands to operate the camera while it is in a steadily supported condition. As it becomes necessary, in following a moving subject, to pivot the camera, vertical pivotation of the camera will cause rotation of the bar 8 within the ears 7, thus moving the lamps 10 with said camera to maintain them in focus at all times with the camera. Additionally, rotation of the camera will cause rotation of the rod 4 within the tube 2, thus rotating the entire assembly above the tube 2 and likewise maintain the lamps upon the subject at all times.

It may thus be seen that a new and novel portable support having provision for a camera and the necessary lighting equipment therewith has been provided which is worn by the photographer and is portable to the extent of the lighting extension allowing him to follow moving subjects and to easily operate the camera into desired positions, simultaneously operating his lighting equipment therewith, thus making the construction set forth in this invention of valuable use.

Additionally it may be easily seen that a substitution of a permanent single exposure camera could be made for the motion picture camera described herein, as well as a substitution for the flash type and other forms of photographic lighting for the flood lights set forth herein.

Having thus described and explained this invention and with full belief that modifications in size, materials used, and general characteristics would not constitute a departure from the spirit of this invention what I desire to claim in Letters Patent is:

1. Photographic apparatus comprising a breast plate having a pair of laterally spaced rearwardly projecting shoulder hooks, a lug on the forward side of said breast plate, a vertical bracket having its lower end journalled in said lug and projecting forwardly and upwardly to a level above said breast plate, a pair of laterally spaced, horizontally aligned barrels fixed on the upper end of said bracket, a horizontal rod journalled through said barrels and having forwardly offset photographic lamps on its opposite ends, a camera shelf having a barrel on its forward end supportably journalled on said rod between said pair of barrels whereby said camera shelf projects rearwardly from said rod, and means for fixedly securing said camera shelf barrel on said rod to align the lens of a camera mounted on said shelf with the axes of said lamps and whereby said camera and lamps can be tilted together vertically on the axis of said rod and turned horizontally on the axis of the lower end of said vertical bracket relative to said breast plate to follow a subject to be photographed.

2. A photographic device comprising a breast plate having means for support from the shoulders of a wearer, a lug on the forward side of said breast plate, a vertical bracket having its lower end pivotally supported on a vertical axis on said lug, a pair of laterally spaced journals on the upper end of said bracket, a horizontal rod journalled through said pair of journals, photographic lamps mounted to project forwardly from opposite ends of said rod, a camera shelf having a journal on its forward end journalled on said rod between said pair of journals whereby said camera shelf projects rearwardly from said rod and whereby the weight of a camera on said shelf can counterbalance the weight of the forwardly projecting lamps, means for fixedly securing the camera shelf journal on said rod with the axes of the camera lens and of the lamps in alignment, and means operating between said lug and said bracket whereby said bracket can be vertically adjusted relative to said breast plate while said device is supported on the wearer.

LEO M. KROGMAN.

REFERENCES CITED

The following references are of record in the file of this patent:

UNITED STATES PATENTS

| Number | Name | Date |
|---|---|---|
| D. 128,505 | Simpson | July 29, 1941 |
| 1,691,733 | Nordin | Nov. 13, 1928 |
| 2,069,186 | Hineline | Jan. 26, 1937 |
| 2,135,797 | Chambers | Nov. 8, 1938 |
| 2,314,033 | Curran | Mar. 16, 1943 |
| 2,345,225 | Walsh | Mar. 28, 1944 |
| 2,370,611 | Du Mais | Feb. 27, 1945 |
| 2,403,892 | McFarlane | July 9, 1946 |
| 2,418,067 | Carpenter | Mar. 25, 1947 |

FOREIGN PATENTS

| Number | Country | Date |
|---|---|---|
| 151,750 | Germany | June 15, 1904 |